(12) United States Patent
Tsutsumi

(10) Patent No.: US 6,626,385 B1
(45) Date of Patent: Sep. 30, 2003

(54) SPINNING REEL FOR FISHING

(75) Inventor: Wataru Tsutsumi, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 10/208,793

(22) Filed: Aug. 1, 2002

(51) Int. Cl.$^7$ .................. A01K 89/00; A01K 89/01; A01K 89/015

(52) U.S. Cl. ............... 242/282; 242/249; 74/545

(58) Field of Search ................. 242/224, 241, 242/242, 249, 282, 283, 284; 74/545

(56) References Cited

U.S. PATENT DOCUMENTS

| | | | | |
|---|---|---|---|---|
| 2,649,257 A | * | 8/1953 | Shelburne | 242/227 |
| 5,244,166 A | * | 9/1993 | Oi | 242/284 |
| 5,308,020 A | * | 5/1994 | Kawabe | 242/284 |
| 5,381,979 A | * | 1/1995 | Furomoto | 242/224 |
| 6,102,315 A | * | 8/2000 | Sato | 242/249 |
| 6,176,446 B1 | * | 1/2001 | Sato | 242/319 |
| 6,484,956 B2 | * | 11/2002 | Kawabe et al. | 242/278 |

FOREIGN PATENT DOCUMENTS

JP      57-102977      6/1982

* cited by examiner

Primary Examiner—Emmanuel Marcelo
(74) Attorney, Agent, or Firm—Sughrue Mion, PLLC

(57) ABSTRACT

The invention is to offer a spinning reel for fishing, in which a handle can be replaced left and right, and an offset amount of a spool shaft and a handle shaft is reduced without lowering strength of these shafts, so that transmitting efficiency of rotating torque from a drive gear to a pinion gear can be heightened and a reel main body can be miniaturized. In the spinning reel for fishing, a part of the handle shaft crossing with the spool shaft is formed as a small diameter portion determined to have a smaller diameter than those of other parts of the handle shaft, and a part of the handle which is connected to the handle shaft is less to extend within the handle shaft to traverse the crossing portion of the spool shaft and the handle shaft.

5 Claims, 5 Drawing Sheets

SPINNING REEL FOR FISHING

BACKGROUND OF THE INVENTION

This invention relates to a spinning reel for fishing.

In general, a spinning reel for fishing comprises a reel main body, a leg part extending from the reel main body, and a fishing rod attaching part which is formed at an end of the leg and to be attached to the fishing rod. A handle shaft to which a handle is fixed is rotatably supported within the reel main body. The handle shaft is fixed with a drive gear which is enaged with a tubular pinion gear extending in a direction transverse with the handle shaft and turnably held to the reel main body. The pinion gear is integrally equipped at a front end with a rotor, and passed through with a spool shaft extending in the direction transverse with the handle shaft. In this case, the spool shaft is arranged coaxially with the pinion gear and can move back and forth in the same direction. In addition, the spool shaft is provided at the front end with a spool for coiling a fishing line thereon.

In an embodiment of a spinning reel capable of replacing the handle left and right, the handle shaft extends to cross with the spool shaft in the reel main body such that both ends securely having the handle face to both left and right sides of the reel main body. The handle shaft has a hollow structure, and the shaft part of the handle is inserted into and fixed to an inner hole of the handle shaft to traverse the above mentioned crossing point (the crossing point between the handle shaft and the spool shaft), whereby the handle is detachably attached to the handle shaft.

Incidentally, if the handle shaft crosses with the spool shaft as traversing it, an axial center of the spool shaft is inevitably offset in a vertical direction (in a direction of extending the leg portion) of the reel main body from an axial center of the handle shaft. If the offset amount is large, there occur several problems as mentioned under.

That is, if the offset amount between the two shafts is large, dimensions in the vertical direction of the reel main body become large, so that the distance between the spool and the fishing rod attaching part of the leg portion largely separates, and the fishing line coiled on the spool is difficult to be thumbed.

If the off set amount between the two shafts is large, transmitting efficiency of rotating torque from the drive gear to the pinion gear is worsened. Namely, the more offset the axial center of the spool shaft is from the axial center of the handle shaft in the vertical direction of the reel main body, the larger an angle made between tangent lines in a contacting position (a position of being engaged) of the pinion gear and the drive gear of the handle shaft being coaxial with respect to the spool shaft, so that the rotating force of the drive gear acting on the pinion gear in the rotating direction becomes small (the rotating torque of the drive gear is not efficiently transmitted to the pinion gear). Therefore, the rotating operation of the handle is made heavy.

In short, in the structure of the handle shaft crossing with the spool shaft as traversing it, it is desirable that the offset amount between the axial center of the handle shaft and the axial center of the spool shaft is small to the utmost.

As a method of making the offset amount small, it is assumed that an outer diameter of the spool shaft or the handle shaft is determined to be small for shortening the distance between the spool shaft and the handle shaft. However, in existing structures, since the handle shaft has a hollow structure, and the shaft portion of the handle is inserted into the handle shaft so as to traverse the crossing point between the spool shaft and the handle shaft, it is difficult to reduce the diameter of the handle shaft while securing enough strength of the handle shaft. On the other hand, since the spool shaft must move back and forth supporting the spool at the front end, a predetermined strength must be kept, so that it is practically impossible to more reduce the diameter of the handle shaft than the existing dimensions.

As disclosed in Japanese Patent Publication No. 205723/1996 if the outer diameter of the drive gear is enlarged, parts of bad influences accompanied with off setting may be dissolved. That is, in case the outer diameter of the drive gear is enlarged, even if the offset amount between the two shafts is large, it is possible to restrain at a certain degree the worsening of the transmitting efficiency of the rotating torque between the drive gear and the pinion gear. But, in this case, inconvenience of the reel main body becoming large in the vertical direction is not dissolved.

For example, as disclosed in Japanese Utility Model publication No. 102977/1982, in case the handle shaft is formed only at one side of the drive gear and does not cross with the spool shaft, any problem does not arise about the offset. But, there still exist problems that the handle cannot be replaced left and right, the reel is not preferable for general-use, and being supported by one-side shaft, endurance, gearing property, or strength are insufficient.

SUMMARY OF THE INVENTION

The invention has been built in view of the above mentioned circumstances, and it is accordingly an object of the invention to offer a spinning reel for fishing in which a handle can be replaced left and right, and an offset amount of the spool shaft and the handle shaft is reduced without lowering strength of these shafts, so that transmitting efficiency can be heightened and the reel main body can be miniaturized.

In order to solve the afore said object, the invention is characterized by having the following arrangement.

(1) A spinning reel for fishing comprising:
　a reel main body;
　a rotor rotatably supported by the reel main body;
　a handle shaft rotatably supported at opposite ends thereof by the reel main body;
　a handle adapted to be detachably attached to each the ends of the handle shaft;
　a drive gear mounted on and integrally rotated with the handle shaft;
　a pinion gear engaged with the drive gear for transmitting rotating force of the drive gear to the rotor;
　a spool shaft extending to cross with the handle shaft in the interior of the reel main body; and
　a spool mounted on the spool shaft on which a fishing line is wound by rotation of the rotor,
　wherein the handle shaft includes a small diameter portion at a part of the handle shaft crossing with the spool shaft which has a smaller diameter than those of the handle shaft, and
　wherein a part of the handle which is connected to the handle shaft does not traverse a portion where the spool shaft crosses the handle shaft.

(2) The spinning reel according to (1), wherein at least the small diameter portion is formed to be hollow to define a through hole.

(3) The spinning reel according to (2), wherein a securing member can be inserted into the through hole from both sides thereof to secure the handle on the handle shaft.

(4) The spinning reel according to (1), wherein the small diameter portion is solid.

(5) The spinning reel according to (1), wherein an outer diameter of the small diameter portion is set to be 17% or less than an outer diameter of the drive gear.

DETAILED DESCRIPTION OF PREFERRED EMBODIMENTS

In the following description, explanation will be made to one embodiment of the invention, referring to the attached drawings.

Figure 1:
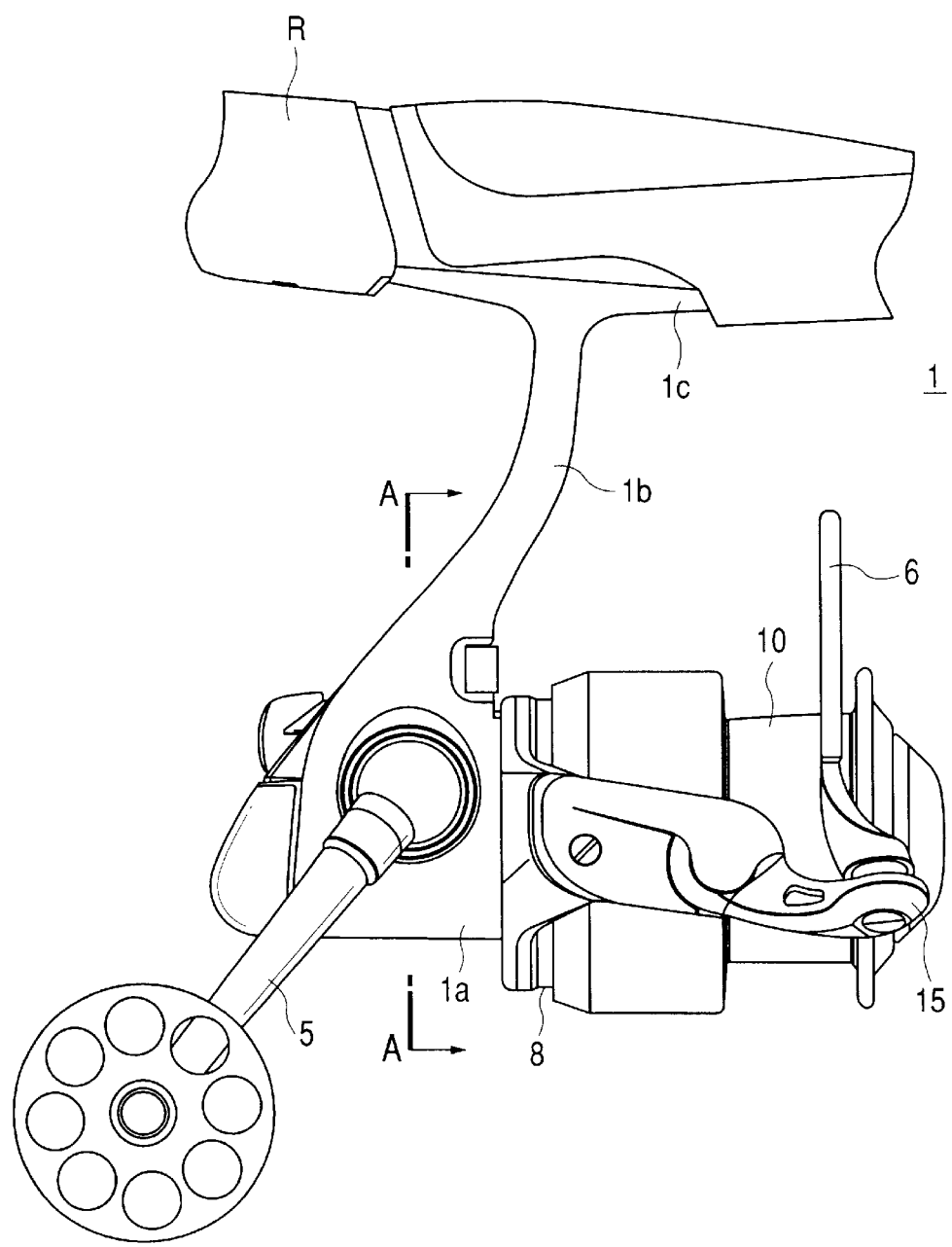
FIG. 1 is a partially cross sectional view of the spinning reel for fishing according to one embodiment of the invention.
Figure 2:
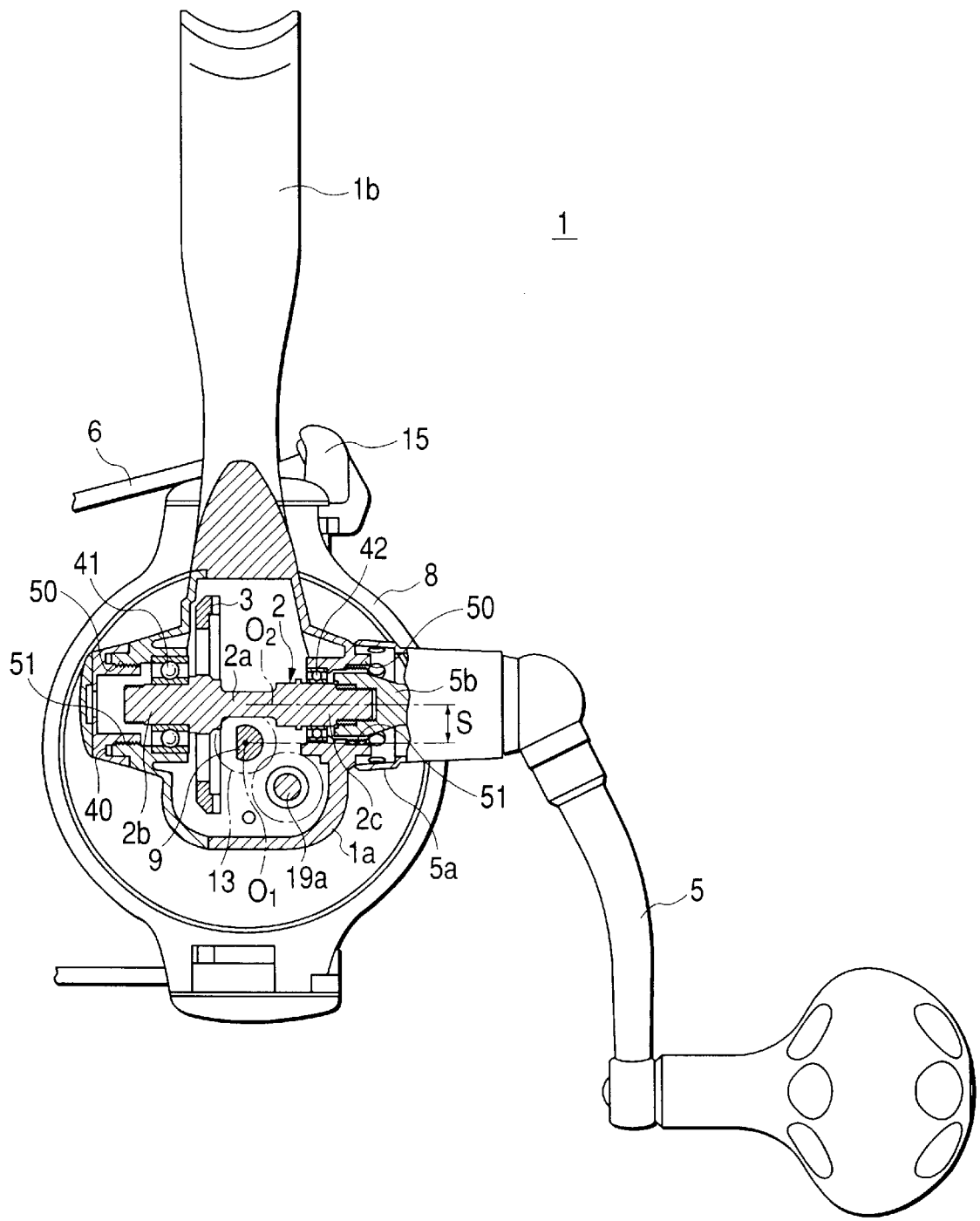
FIG. 2 is a cross sectional view along A—A line of FIG. 1.
Figure 3:
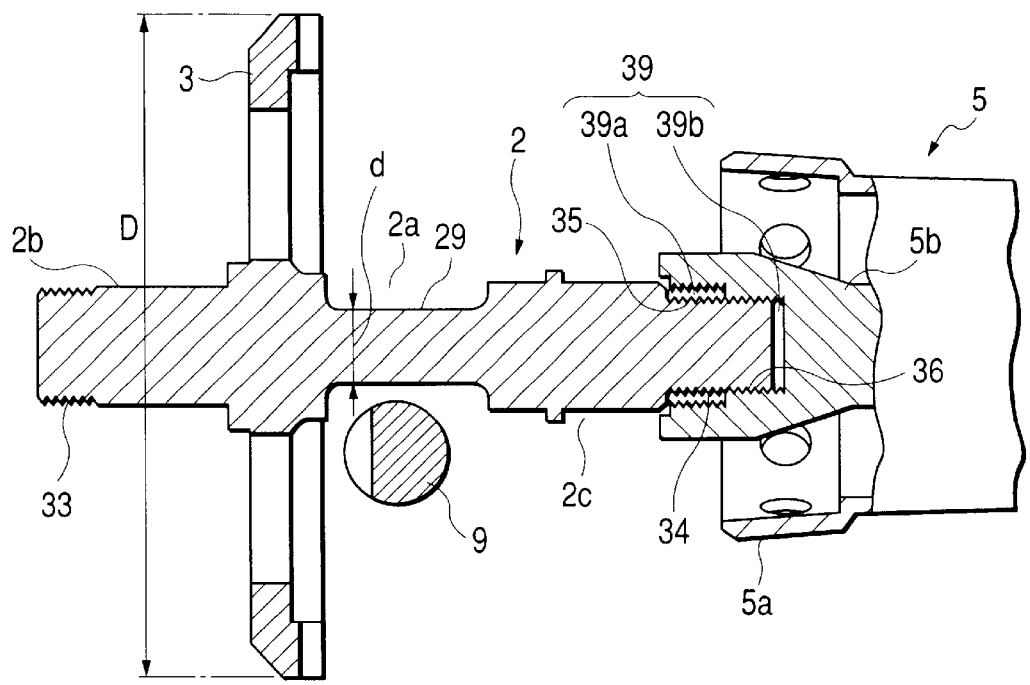
FIG. 3 is a cross sectional view of the spinning reel for fishing of FIG. 1.

FIGS. 1 to 3 show one embodiment of the invention. As seen in FIGS. 1 and 2, the spinning reel for fishing 1 according to this embodiment comprises a reel main body 1a, a leg 1b extending from the reel main body 1a, and a fishing rod attaching part 1c which is formed at the end of the leg 1b and to be attached to the fishing rod R. In the interior of the reel main body 1a, the handle shaft 2 fixed to the handle 5 is rotatably supported. The handle shaft 2 is secured with the drive gear 3 which is engaged with a pinion gear 13 extending in a direction transverse with the handle shaft 2 and being rotatably supported by the reel main body 1a via bearings. The pinion gear 13 is provided at its front end with one body unified of a bail 6 and the rotor 8 having a fishing line guide apparatus 15.

The spool shaft 9 extends in a direction crossing with the handle shaft 2 and passes through the pinion gear 13. In this case, the spool shaft 9 is arranged coaxially with the pinion gear 13 and capable of moving back and forth in a direction crossing with the handle shaft 2. The spool shaft 9 is attached at its front end with the spool 10 for winding the fishing line thereon.

The drive gear 3 is engaged with an oscillating mechanism (not shown) through the pinion gear 13. The oscillating mechanism comprises a worm shaft (traverse camshaft) 19a engaged with the pinion gear 13 and rotating, and a slider engaged with a groove of the worm shaft 19a and provided to the spool shaft 9 being unable to move in the axial direction. When the handle shaft 2 is rotated by the rotating operation of the handle 5, the oscillating mechanism reciprocates (back and forth) the spool shaft 9 in the axial direction.

With such a structure, when the handle 5 is operated to rotate the handle shaft 2, the spool 10 furnished on the spool shaft 9 reciprocates back and forth via the oscillating mechanism, and at the same time the rotor 8 is driven via the drive gear 3 and the pinion gear 13. Accordingly, the fishing line is evenly wound on the spool 10 through the fishing line guide apparatus 15.

As clearly shown in FIG. 2, the handle shaft 2 extends to cross with the spool shaft 9 in the reel main body 1a for enabling to change the handle 5 to right or to left. Specifically, opposite sides of the handle shaft 2 are rotatably supported on the reel main body 1a through the bearings 41, 42, while both left and right ends 2b, 2c of the handle shaft 2 to be secured with the handle 5 are positioned in openings 50, 50 formed in both left and right sides of the reel main body so as to face both left and right sides of the reel main body 1a. The openings 50, 50 of the reel main body 1a are threaded with female screws 51 into which covers 40 are screwed for closing the openings 50.

FIG. 3 shows the handle shaft 2 in detail. As illustrated, the handle shaft 2 has a solid structure and is formed on the outer periphery with a ring-like recess 29 almost at the center crossing with the spool shaft 9. That is, the part of the handle shaft 2 crossing with the spool shaft 9 is formed as a small diameter portion 2a which is determined to have a smaller diameter than other parts of the handle shaft 2 including both left and right ends 2b, 2c. By the way, the ring-like recess 29 is determined to have a size enabling to receive inside at least one part of the spool shaft 9. In particular, the outer diameter d of the small diameter portion 2a is set to be 17% or less than the outer diameter D of the drive gear 3 ($d/D \leq 0.17$).

The outer diameter of the left end part of the handle shaft 2 is set to be larger than that of the right end part 2c of the handle shaft 2. The left end part 2b is defined in the outer periphery thereof with a first male screw (normal screw) 33, while the right end part 2c is defined in the outer periphery thereof with a second male screw (inverse screw) 34 opposite in the threading direction to the first male screw 33.

The handle 5 detachably attached to the handle shaft 2 has a connecting part 5b to be screwed in both left and right ends 2b, 2c of the handle shaft 2, and a covering part 5a which is provided to encircle the outside of the connecting part 5b and to cover the opening 50 of the reel main body 1a.

The connecting part 5b is formed with a stepped hole 39. The stepped hole 39 comprises a large diameter hole 39a positioned outside and a small diameter hole 39b positioned inside. The large diameter hole 39a is formed in the inner periphery with a first female screw 35 to be screwed with the first male screw 33, while the small diameter hole 39b is formed in the inner periphery with a second female screw 36 to be screwed with the second male screw 34.

As mentioned above, in the spinning reel for fishing 1 according to the embodiment, the small diameter part 2a is formed on the part of the handle shaft crossing with the spool shaft 9 and is defined to be smaller in the outer diameter than other parts of the handle shaft 2. Accordingly, as seen in FIGS. 2 and 3, the spool shaft 9 and the handle shaft 2 can be crossed such that at least one part of the spool shaft 9 is positioned inside of the ring-like recess 29 of the handle shaft 2. Therefore, a distance (offset amount) S between an axial center O2 of the handle shaft 2 and an axial center O1 of the spool shaft 9 can be shortened than that of a conventional art by an amount that the spool shaft 9 enters into the inside of the ring-like recess 29, while the handle 5 can be replaced left and right. Besides, since the handle shaft 2 is made small diameter only in the part of crossing with the spool shaft 9, the distance between the spool shaft 9 and the handle shaft 2 can be shortened without decreasing strength.

In this embodiment, in addition to the above mentioned structure, the shaft portion of the handle 5 is not inserted into the handle shaft 2 as traversing the crossing part between the spool shaft 9 and the handle shaft 2, but the male screws 33, 34 are defined in the outer periphery of the handle shaft 2 and are capable of being screwed into the female screws 35, 36 of the connecting part of the handle 5. Besides, the handle shaft 2 has a solid structure. Therefore, it is possible to accelerate reduction in diameter of the whole of the handle shaft 2 including the small diameter portion 2a, and to further shorten the distance between the handle shaft 2 and the spool shaft 9 (the offset amount between the two shafts) while keeping strength of the handle shaft 2 sufficient.

As mentioned above, by reducing the offset amount of the spool shaft 9 to the handle shaft 2 to bring the spool shaft 9 nearly to the handle shaft 2, it is possible to heighten the transmitting efficiency of rotating torque from the drive gear 3 to the pinion gear 13, lighten rotation of the handle 5, and also bring a worm shaft 19a under an attaching position of the spool shaft 9 by its position nearly to the handle shaft 2, so that dimensions in a vertical direction of the whole of the reel can be reduced than those of the prior art, and the reel can be miniaturized.

By reducing the offset amount of the spool shaft 9 to the handle shaft 2 and reducing the dimensions in a vertical direction of the whole of the reel 1a, the distance between the spool and the fishing rod attaching part is shortened accordingly, and the fishing line wound on the spool is easily thumbed.

In the embodiment, since the outer diameter d of the small diameter portion 2a of the handle shaft 2 is set to be 17% or less than the outer diameter D of the drive gear 3 ($d/D \leq 0.17$). Therefore, while securing the gear ratio as conventionally, the transmitting efficiency of the driving force can be increased.

Figure 4:
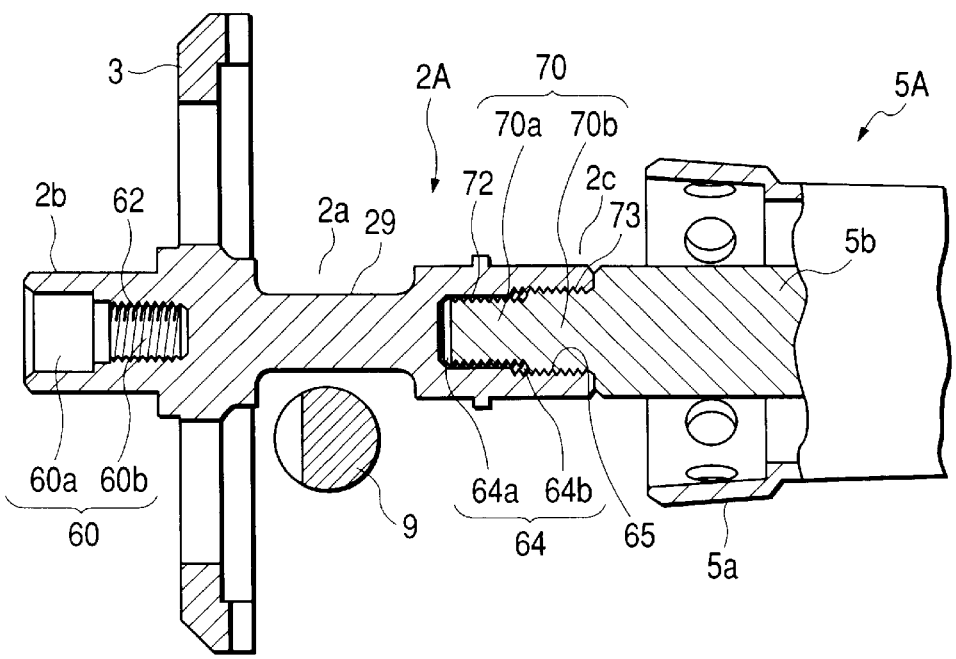
FIG. 4 is a cross sectional view of the first modified embodiment of the handle shaft.

FIG. 4 shows a first modification of the handle shaft. This modified handle shaft 2A is defined with holes only in both left and right ends 2b, 2c (accordingly, the small diameter portion 2a is solid). Specifically, the stepped holes 60, 64 are respectively provided in both left and right ends 2b, 2c. The stepped hole 60 provided in the left end 2b comprises the large diameter hole 60a positioned outside and the small diameter hole 60b positioned inside. In this case, the small diameter hole 60b is formed in the inside periphery with the first female screw (normal screw) 62. The stepped hole 64 provided in the right end 2c comprises the large diameter hole 64b positioned outside and the small diameter hole 64a positioned inside. In this case, the large diameter hole 64b is formed in the inside periphery with the second female screw (inverse screw) 65 in the screwing direction inverse to the first female screw 62. Other structures are the same as those of the handle shaft 2 of the above mentioned embodiment.

On the other hand, the connecting part 5b of the handle 5A to be detachably attached to the handle shaft 2A is formed with a stepped protrusion 70 screwed in the stepped holes 60, 64 of both left and right ends 2b, 2c of the handle shaft 2A. This protrusion 70 comprises the small diameter portion 70a positioned at the front end and the large diameter portion 70b positioned at a stem side. In this case, the small diameter portion 70a is formed on the outer periphery with a first male screw 72 for the first female screw 62, and the large diameter portion 70b is formed on the outer periphery with a second male screw 73 for the second female screw 65. Other structures are the same as those of the handle 5 of the above mentioned embodiment.

With such a structure, the similar working effects to those of the above mentioned embodiment may be brought about, and only by loosening the handle 5 and tightening it in the opposite side, the handle can be easily replaced left and right.

Figure 5:
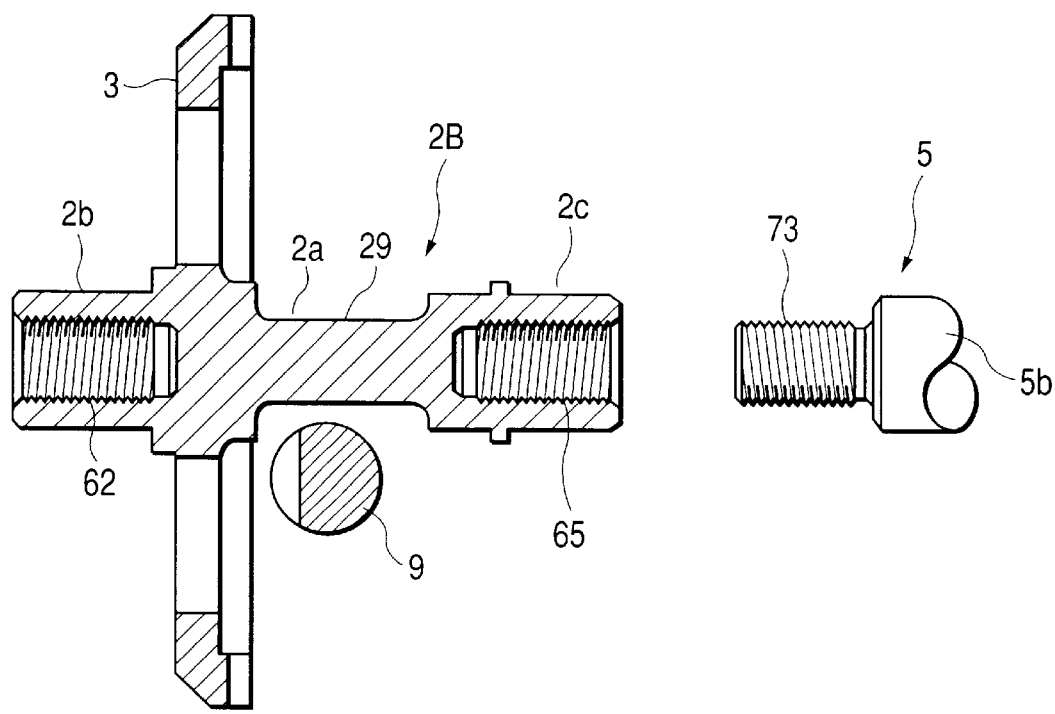
FIG. 5 is a cross sectional view of the second modified embodiment of the handle shaft.

FIG. 5 shows a second modification of the handle shaft 2B. Being different from the first modified embodiment, an inverse screw is not provided in the side of the handle 5. Therefore, the screw portion has to be exchanged for replacing the handle 5 left and right, but while the screw portion is secured to be large, the length in the axial direction can be shortened, and while the body is made compact, high supporting strength can be provided. Common parts in FIG. 5 to FIG. 4 are given the same numerals.

Figure 6:
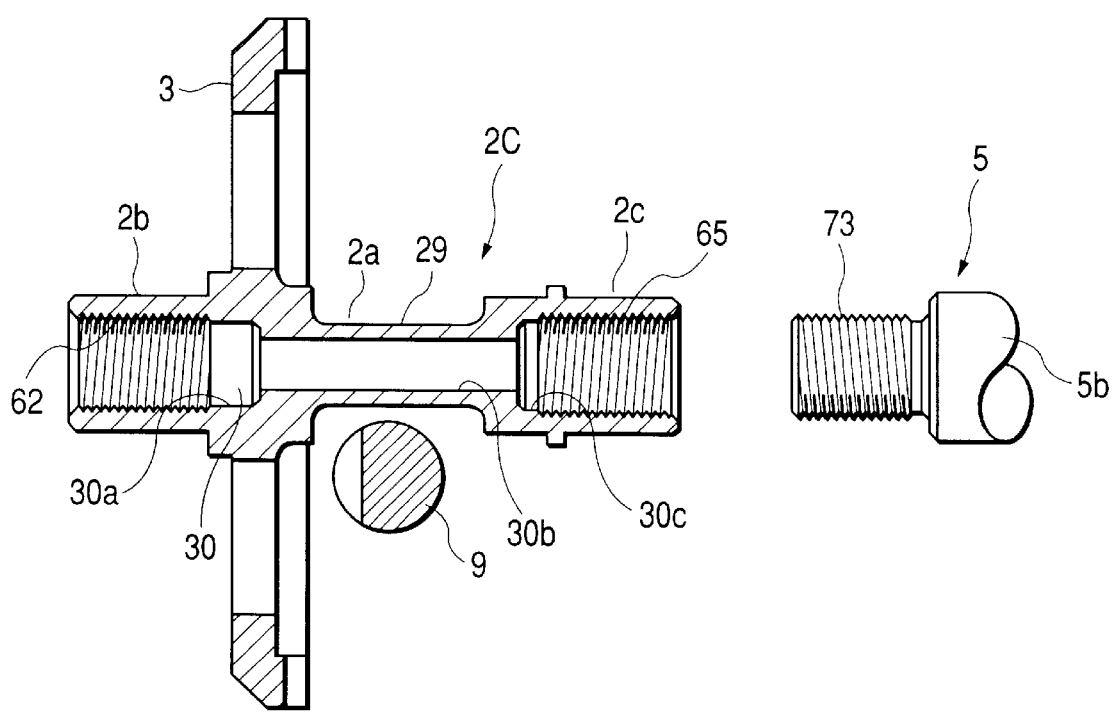
FIG. 6 is a cross sectional view of the third modified embodiment of the handle shaft.

FIG. 6 shows a third modification of the handle shaft 2C. In this modification, in addition to the structure of the second modification, the small diameter portion 2a is hollow. Specifically, a through-hole 30 is formed continuously over the full length of the handle shaft 2, and at the same time, for securing strength of the small diameter portion 2a of the handle shaft 2, the inner diameter of a part 30b of a through-hole 20 positioned in the small diameter portion 2a is determined to be smaller than the inner diameters of the parts 30a, 30b of the other through-hole 30. Common parts in FIG. 6 to FIG. are given the same numerals.

By making the handle shaft 2 of the hollow structure, the handle shaft 2 can be lightened, and in turn the reel of high strength and light weight may be brought about.

Figure 7:
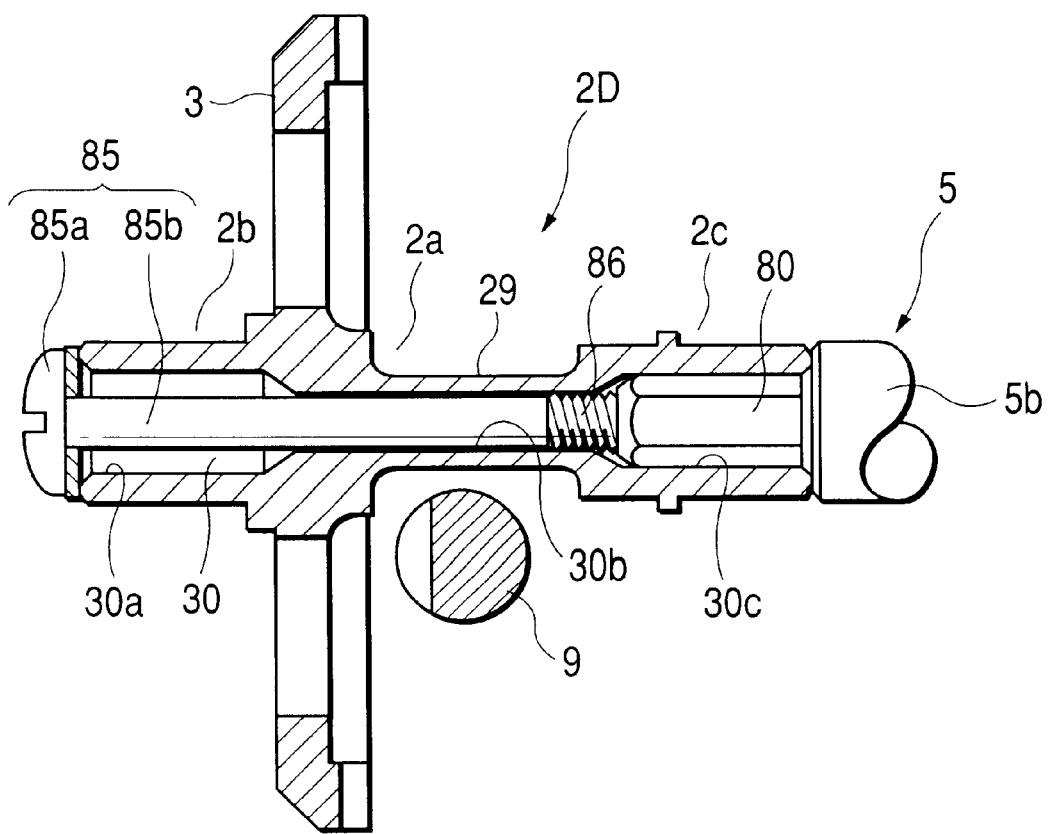
FIG. 7 is a cross sectional view of the fourth modified embodiment of the handle shaft.

FIG. 7 shows a fourth modification of the handle shaft 2D. In this modification, the handle shaft 2D has basically the same structure as the hollow handle shaft 2C shown in FIG. 6. Accordingly, common parts in FIG. 7 to FIG. 6 are given the same numerals. In this modification, the connecting part 5b of the handle 5 is formed at an end with a projection 80 fitted as whirl-stop within both left and right ends 2b, 2c of the handle shaft 2. The projection 80 is connected to a securing member 85 inserted from an end 2b (2c) of the handle shaft 2 under a condition of being fitted as whirl-stop in the other end 2c (2b) of the handle shaft 2D so as to prevent the projection 80 from getting out from the handle shaft 2D. Specifically, the securing member 85 comprises ahead portion 85a adapted to be brought into contact with both left and right ends 2b, 2c of the handle shaft 2 and a pin 85b extending from the head portion 85a and whose outer diameter is substantially the same as or smaller than the inner diameter of the small diameter portion 2a of the handle shaft 2D, and a screw portion 86 defined at the end of the pin 85 which is screwed with the projection 80 of the handle. By screwing the screwing portion 86 into the projection 80 of the handle 5 by a predetermined amount so that the head portion 85a of the securing member 85 is brought into contact with the end 2b (2c) of the handle shaft 2, the handle 5 can be firmly attached to the handle shaft 2D. The fitting in whirl-stop of the projection 80 and the handle shaft 2D can be realized by, for example, making the outside shapes of the projection 80 or the inside shapes of both left and right ends 2b, 2c of the handle shaft 2 polygonal such as hexagonal or square shapes.

Thus, in this modification, it is possible to insert the securing member 85 having smaller axis diameter than that of the handle shaft 2D into the handle shaft 2D from the opposite side of the handle (the opposite side to the side to be provided with the handle 5), and reinforce the hollow part in the small diameter portion 2a with the securing member 85. Therefore, the small diameter portion 2a is restrained from lowering of strength, and the handle shaft 2 is effectively avoided from deflection when winding the fishing line. Accordingly, it is possible to solve gear engagement failure between the pinion gear 13 and the drive gear 3 caused by deflecting the handle shaft 2 and shortage of rigidity.

As mentioned above, according to the spinning reel for fishing of the invention, the handle can be replaced left and right, and the offset amount of the spool shaft and the handle shaft is reduced without lowering strength of these shafts, so that the transmitting efficiency can be heightened and the reel main body can be miniaturized.

What is claimed is:

1. A spinning reel for fishing comprising:

a reel main body;

a rotor rotatably supported by the reel main body;

a handle shaft rotatably supported at opposite ends thereof by the reel main body;

a handle adapted to be detachably attached to each of the ends of the handle shaft;

a drive gear mounted on and integrally rotated with the handle shaft;

a pinion gear engaged with the drive gear for transmitting rotating force of the drive gear to the rotor;

a spool shaft extending to cross with the handle shaft in the interior of the reel main body; and a spool mounted on the spool shaft on which a fishing line is wound by rotation of the rotor, wherein the handle shaft includes a small diameter portion at a part of the handle shaft crossing with the spool shaft which has a smaller diameter than those of the handle shaft, and wherein a part of the handle which is connected to the handle shaft does not traverse a portion where the spool shaft crosses the handle shaft.

2. The spinning reel according to claim 1, wherein at least the small diameter portion is formed to be hollow to define a through hole.

3. The spinning reel according to claim 2, wherein a securing member can be inserted into the through hole from both sides thereof to secure the handle on the handle shaft.

4. The spinning reel according to claim 1, wherein the small diameter portion is solid.

5. The spinning reel according to claim 1, wherein an outer diameter of the small diameter portion is set to be 17% or less than an outer diameter of the drive gear.

* * * * *